Jan. 7, 1947.  L. EISELE  2,413,959
CLINICAL THERMOMETER
Filed June 19, 1944
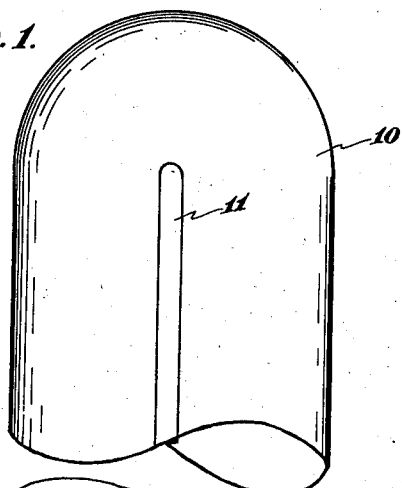
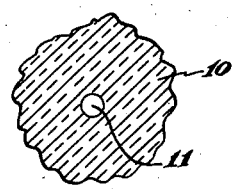
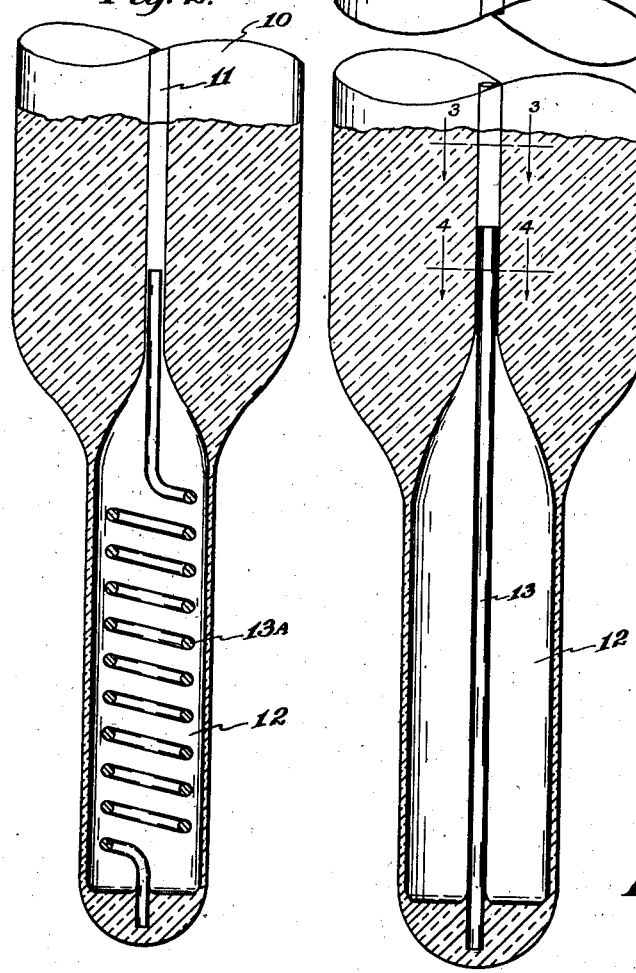
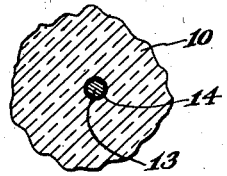
LOGAN EISELE
INVENTOR
BY Robert T. Killman
ATTORNEY Patented Jan. 7, 1947

2,413,959

UNITED STATES PATENT OFFICE 2,413,959

CLINICAL THERMOMETER

Logan Eisele, Nashville, Tenn.

Application June 19, 1944, Serial No. 541,023

1 Claim. (Cl. 73—371)

This invention relates to clinical or self-registering thermometers. This type thermometer may be defined as one which, upon being inserted in the oral or rectal cavity or other place the temperature of which it is desired to ascertain the mercury column will rise to the proper point to indicate the temperature upon a suitable scale, usually engraved upon the thermometer stem, but, upon being removed from said cavity, the mercury column will maintain its position in the stem, thus allowing the reading to be made at any time subsequent to such removal, due to the fact that this type of thermometer includes a device which causes the mercury column to separate into two parts at some point between the bulb and the scale, the lower part of the column receding into the bulb as the temperature of the thermometer falls to the ambient temperature, while leaving the upper portion of the mercury column in the highest position it reached during the time the thermometer was inserted in the cavity.

The device by which the mercury column is caused to divide or separate as the temperature of the bulb falls usually is called the contraction and usually consists of a small, partially collapsed bulb formed in the thermometer bore between the main bulb and the scale portion of the stem. The two opposite walls of said contraction bulb are collapsed against each other forming a bifurcated passage of reduced cross section as compared to the bore of the thermometer stem.

The contraction so formed constitutes such an obstruction to the movement of the mercury column that the cohesive force of the mercury is unable to pull the upper portion of the mercury column therethrough, thus causing the column to divide at the contraction.

The proper forming of this contraction requires great skill in manipulation and even under optimum conditions a large percentage of rejects are inevitable.

It is an object of this invention to disclose a new and novel form of contraction which will serve all the useful purposes of the usual form of contraction, but which may be made by relatively unskilled operators and which will eliminate several operations necessary to make the prior form of contraction and which will result in a much smaller percentage of rejects.

The construction of my new form of clinical or self-registering thermometer contraction may best be understood by referring to the accompanying drawing in which:

Figure 1 is a partial longitudinal section of a preferred form of the thermometer of my invention.

Figure 2 is a partial longitudinal section of an optional form of my invention.

Figures 3 and 4 are cross section views taken along section lines 3—3 and 4—4 respectively of Figure 1.

Referring now in detail to the drawing the numeral 10 denotes the stem of glass containing the axially positioned capillary bore 11. A suitable scale (not shown) is engraved upon the surface of stem 10 and shows, by the height of the top of the mercury column in bore 11, the temperature to which the bulb 12 of the thermometer is or has been subjected.

The bulb 12 serves as a container for an expansible liquid, usually mercury. A wire or rod 13 of metal or other suitable material has its lower end embedded, welded, or fused into the thickened lower end of bulb 12 while its upper end extends into the bore or capillary 11 for a short distance. In practice the diameter of the bore is of the order of .0015 inch and the diameter of the wire is of the order of .001 inch. Thus it will be seen that the portion of the bore into which the wire 13 extends will be restricted to an annulus 14 having an external diameter of the order of .0015 inch and an internal diameter of the order of .001 inch. This portion of annular cross section constitutes the contraction which causes the mercury column to divide when the bulb cools off, allowing the upper portion of the column to remain in its indicating position.

The operation of my new improved thermometer is as follows:

Upon being subjected to an elevated temperature the mercury in bulb 12 expands and travels upward and forces through annulus 14 past the upper end of rod 13 into bore 11 in which it rises to indicate the temperature to which bulb 12 has been subjected. Upon being removed from the source of heat, the mercury contained in bulb 12 contracts and the column divides in the annulus 14 at the upper end of rod or wire 13, the lower part receding into the bulb and the upper part remaining in its indicating position. After the reading has been taken the upper portion of the mercury column may be caused to rejoin that in the bulb by shaking it down in the usual manner.

I have observed certain other advantages of my construction. The presence of the metal wire in the bulb and bore causes thermometers made in this way to reach their correct indicating position much quicker than thermometers constructed in the usual manner. This seems to be due to the superior heat conductivity of the wire.

A further advantage observed in my new construction is that it is not subject to clogging by minute impurities in the mercury. Upon heating and cooling there seems to be a relative movement between the wire or rod 13 and the walls of the bore 11 due to differences in the coefficient of expansion of the two which tends to loosen and remove any obstructive matter.

In Figure 2 I have shown an optional form of my invention in which the wire 13A is coiled into a helical spring in the bulb 12. This construction increases the two advantageous effects just pointed out, i. e., the conduction of heat by the wire through the bulb is increased and also the movement of the upper end of the wire relative to the walls of bore 11 is also increased.

While I have shown bore 11 and wire 13 of circular cross-section, it is understood that the cross section of the bore 11 and/or the wire or rod member 13 may be polyangular, oval, fluted or of any other suitable form.

While the invention has been described in language more or less specific as to structural features, it is to be understood that the invention is not to be limited to the specific features shown, but that means and construction herein disclosed comprise the preferred forms of putting my invention into effect, and the invention is therefore claimed in any of its forms or modifications within the legitimate and valid scope of the appended claim.

I claim:

A clinical or self-registering thermometer comprising a stem portion having a small bore of uniform diameter therethrough, a bulb for containing a thermo-expansive liquid joined to said stem and communicating with said bore, and a wire or rod member of uniform diameter slightly less than that of the bore secured at one end in said bulb and its other end extending for a relatively short distance into the lower end of said bore and partially plugging said bore.

LOGAN EISELE.